United States Patent [19]

Felder

[11] Patent Number: 4,603,771
[45] Date of Patent: Aug. 5, 1986

[54] SORTING INSTALLATION FOR PIECE GOODS
[75] Inventor: Christian Felder, Dreieichenhain, Fed. Rep. of Germany
[73] Assignee: Gebhardt Fördertechnik GmbH, Fed. Rep. of Germany
[21] Appl. No.: 487,863
[22] Filed: Apr. 22, 1983
[30] Foreign Application Priority Data
Apr. 23, 1982 [DE] Fed. Rep. of Germany ....... 3215160
[51] Int. Cl.⁴ .............................................. B65G 37/00
[52] U.S. Cl. .................................................... 198/367
[58] Field of Search ............... 198/369, 371, 372, 367, 198/361, 346, 365; 209/702, 703, 942

[56] References Cited
U.S. PATENT DOCUMENTS

| | | | |
|---|---|---|---|
| 1,439,825 | 12/1922 | Kuhn et al. | 209/703 |
| 1,472,679 | 10/1923 | Roddy | 198/369 |
| 1,939,891 | 12/1933 | Glahn et al. | 198/372 |
| 1,980,261 | 11/1934 | Fenton | 198/367 |
| 2,564,056 | 8/1951 | Fahey | 198/346 |
| 2,625,309 | 1/1953 | Cox | 198/346 |
| 2,899,086 | 8/1959 | Saint-Andre | 198/365 |
| 3,592,333 | 7/1971 | Sullivan et al. | 198/361 |

Primary Examiner—Joseph E. Valenza
Assistant Examiner—Kyle E. Shane
Attorney, Agent, or Firm—Craig & Burns

[57] ABSTRACT

A sorting installation for piece goods arriving in an unsorted condition which must be continuously conveyed to associated locations in warehouses for storage and in the course thereof must be controlled, sorted, recorded and further conveyed to their ultimate destination in the warehouse, includes a main conveyor with a cross conveyor and auxiliary conveyors connected thereto in such a manner that a distributor conveyor adapted to be driven reversibly is provided at the outlet of the auxiliary conveyor and substantially perpendicular thereto; the distributor conveyor is connected at each of its ends by way of intermediate tracks with respective sorting stations, whereby a common delivery conveyor is coordinated to a number of sorting stations thus interconnected.

16 Claims, 7 Drawing Figures

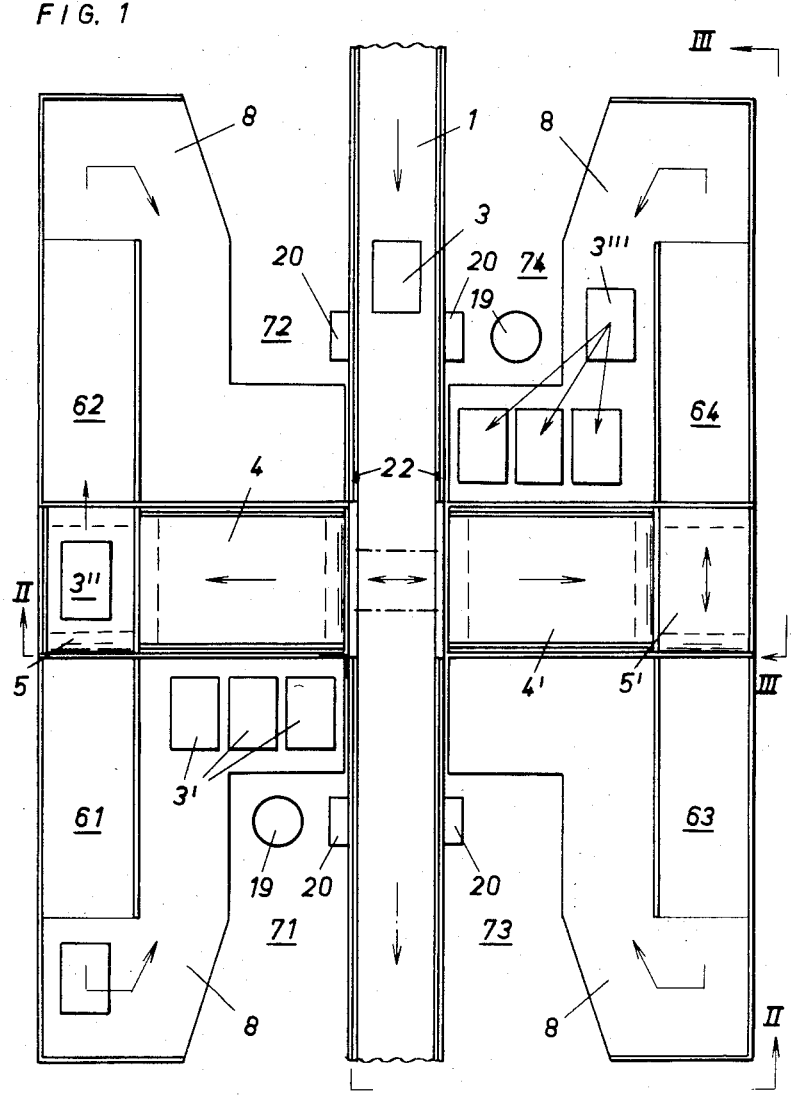

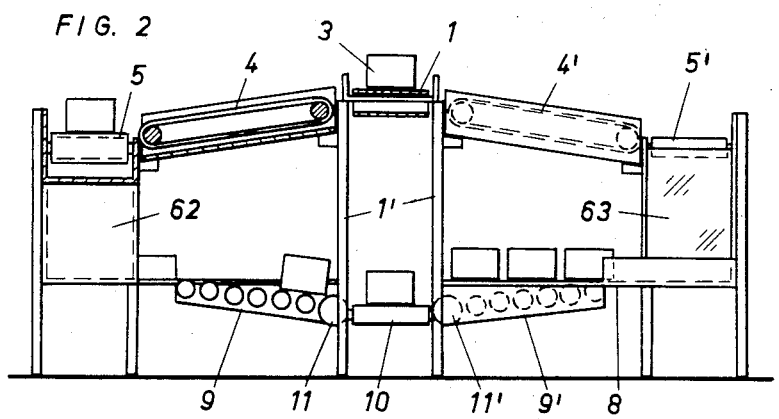
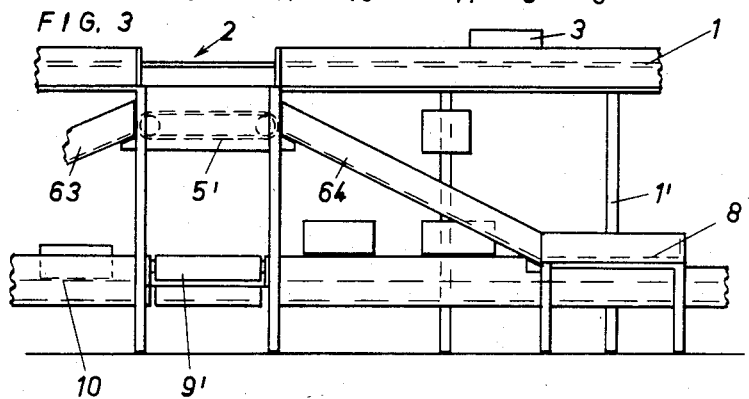
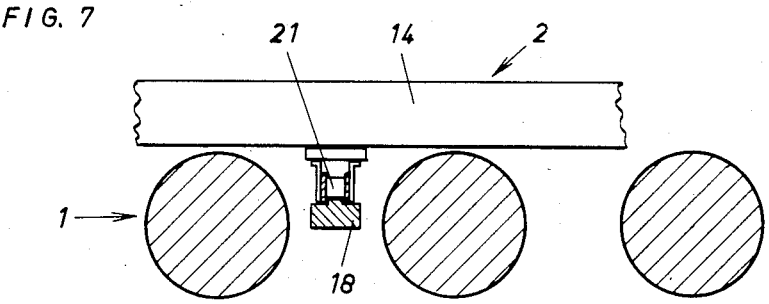

SORTING INSTALLATION FOR PIECE GOODS

The present invention relates to a sorting installation for piece goods with a feeding main conveyor, in which is arranged a cross conveyor, to which is connected an auxiliary conveyor.

In warehouses with a large number of different types of goods, the goods have to be continuously conveyed to their assigned storage place. The goods which arrive in non-sorted condition, must thus be controlled, sorted and then be further conveyed. Since all types of goods must be handled at each sorting station, the connection of each sorting station with each individual storage place is absolutely necessary. Additionally, each article has to be registered in the central storage or memory device of a suitable apparatus, such as a computer, in order to obtain a control about the respective inventory and the movement of the piece goods. The operations to be carried out in the sorting installation are therefore very numerous and complex.

Accordingly, it is the object of the present invention to provide a sorting installation which permits a high sorting output and efficiency with constricted spatial requirements.

The underlying problems are solved according to the present invention in that at the outlet of the auxiliary conveyor and perpendicular thereto, a reversibly drivable distributor conveyor is provided, which with its two ends is connected with one sorting station each by way of intermediate tracks, whereby a delivery track is coordinated in common to the sorting stations.

The advantages achieved with the present invention reside in particular in that a rapid removal is possible from the main conveyor by the cross conveyor in order that piece goods can be conveyed on the main conveyor with high velocity and high density. Furthermore, a further distribution of the goods with accumulation and storage possibilities is achieved by the conveyors connected downstream. Each sorting station can thus be supplied continuously and adequately with piece goods to be sorted. After the sorting and registering, the piece goods are then further conveyed with a new address or destination on a delivery track coordinated in common to several sorting stations, for example, to the associated storage place. As a result of the concentration of the piece goods on the delivery track, this delivery conveyance also takes place in a space-saving manner. The sorting installation according to the present invention possesses a high space utilization and an appropriate construction of the sorting stations as a consequence of the particular lay-out and arrangement of the different conveyors so that a high sorting efficiency is attainable.

These and other objects, features and advantages of the present invention will become more apparent from the following description when taken in connection with the accompanying drawing which shows, for purposes of illustration only, two embodiments in accordance with the present invention and wherein:

FIG. 1 is a plan view of a sorting station in accordance with the present invention;

FIG. 2 is a cross-sectional view of the sorting station in accordance with the present invention, taken along line II—II of FIG. 1;

FIG. 3 is a cross-sectional view of the sorting station in accordance with the present invention, taken along line III—III of FIG. 1;

FIG. 7 is a partial cross-sectional view through a modified embodiment of a cross conveyor in accordance with the present invention.

Figure 4:
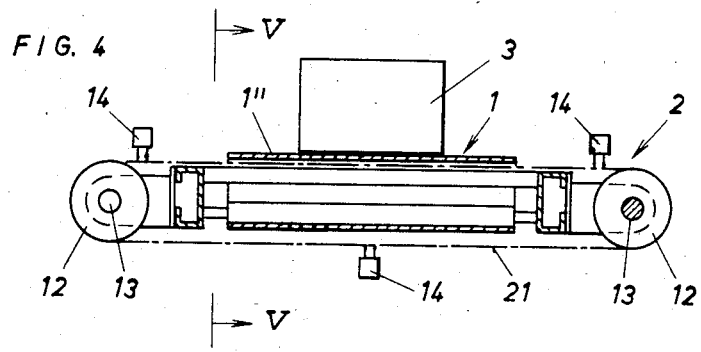
FIG. 4 is a cross-sectional view through the cross conveyor in accordance with the present invention.

Referring now to the drawing wherein like reference numerals are used throughout the various views to designate like parts, the sorting installation of the present invention, for purposes of conveying the incoming piece goods to be sorted, includes according to FIGS. 1 to 3, a driven main conveyor 1 supported on a frame 1', which may be constructed as a belt or roller conveyor. A cross conveyor generally designated by reference numeral 2 is provided in the main conveyor 1 within the area of the sorting installation in order to remove the piece goods 3 selectively toward the right or toward the left (as seen in FIGS. 1 and 2). For this purpose, one auxiliary conveyor 4, respectively, 4' each arranged transversely to the main conveyor 1 is connected to the two ends of the cross conveyor 2. The auxiliary conveyor 4 or 4' is constructed preferably as a driven belt or roller-conveyor. A short distributor conveyor 5, respectively, 5', preferably a belt conveyor, adjoins the auxiliary conveyor 4, respectively, 4' and extends perpendicular to the auxiliary conveyor 4, respectively 4', i.e., parallel to the main conveyor 1; the short distributor conveyor 5, respectively, 5' can be driven in the one or the other direction of rotation, depending on need, by a suitable motor (not shown). Each end of the distributror conveyor 5 and 5' terminates in an intermediate track 61, 62, respectively, 63, 64. Each intermediate track is inclined downwardly and constructed preferably as slide and terminates in a respective sorting station 71, 72, respectively, 73, 74. Each sorting station essentially includes a horizontal platform 8 which extends back in parallel to the intermediate track 61, 62, 63, 64 and thus offers space for stopping, depositing and sorting the piece goods.

A conveyor 9, respectively, 9' (FIG. 3) which is provided below the auxiliary conveyor 4, respectively 4', extends longitudinally parallelly thereto; the conveyor 9, respectively, 9' is constructed for conveying the sorted goods in the direction of a delivery conveyor 10 arranged underneath the main conveyor 1. The platform 8 which adjoins the delivery conveyor 9, respectively, 9' on both sides thereof, is located along the longitudinal side of a corresponding conveyor 9 or 9' and approximately at the same height so that any piece good 3' disposed on the patform 8 can be pushed directly onto the conveyor 9, respectively, 9'. The latter is preferably constructed as a gravity-roller-conveyor and includes as a last roller ahead of the delivery conveyor 10, a driven loading roller 11, respectively, 11' which is supported slightly raised with respect to the conveying plane of the feed conveyor 9, respectively. 9'.

Figure 5:
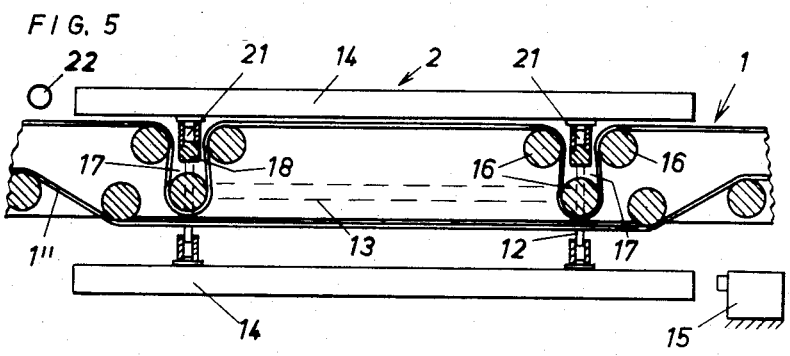
FIG. 5 is a cross-sectional view of the cross conveyor, taken along line V—V of FIG. 4.
Figure 6:
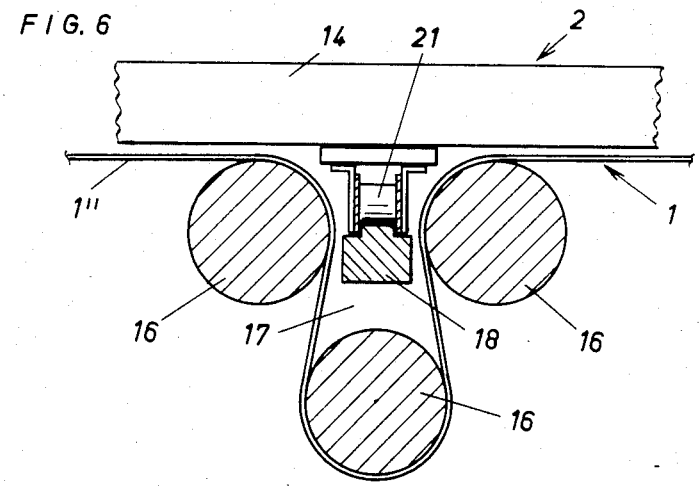
FIG. 6 is a partial cross-sectional view through the cross conveyor in accordance with the present invention.

According to FIGS. 4 to 6, the cross conveyor 2 is constructed as chain driven pusher. For this purpose, at least two parallel, endless chains 21 are provided transversely to the conveying direction of the main conveyor 1 and parallel to the conveyance plane thereof; on both sides of the main conveyor 1 and on the outside thereof, the chains 21 are entrained on sprocket wheels 12 and are controlled thereby. The sprocket wheels are rigidly coupled with each other pairwise by shafts 13 whereby a reversibly drivable gear motor (not shown) is connected to one shaft. The upper section of the chains 21 lies below the conveyance plane of the main conveyor 1 so that piece goods 3 can be transported on the main conveyor 1 above the chains 21. A rod-shaped pusher 14 secured at the chains 21 serves for the removal of the piece goods 3 from the main conveyor 1. The pusher 14 is disposed above the conveyance plane and can be moved to and fro in parallel to the longitudinal axis of the main conveyor 1 transversely above the main conveyor 1. In order to obtain short lead times, several pushers 14 are provided, of which in the normal position of the cross conveyor 2, two pushers 14 are located closely adjacent the main conveyor 1 on both sides thereof whereas a third pusher 14 hangs down from the lower section and serves as marking for a switch 15 such as a light barrier, a proximity switch or the like in order to turn off the drive. Since the chains 21 are always moved only by one division, the pushers 14 are arranged at equal spacings.

If the main conveyor 1 is constructed as a belt conveyor, then the belt 1" (FIGS. 5 and 6) is guided within the area of the endless chains 21 downwardly in the form of a loop 17 open at the top by way of three guide rollers 16. The upper section of the chains 21 is guided inside of this loop 17 on a support profile 18, whereby the pusher 14 is located above the belt 1" and is deflected adjacent the belt 1" by the sprocket wheels 12. If, according to FIG. 7, the main conveyor 1 is constructed as roller-conveyor, then the support of the chains 21 takes place correspondingly between the rollers.

It can be seen that a piece good 3, after passing a switching device 22 (FIG. 1) provided at the main conveyor 1, such as a light barrier, reading device or the like is pushed onto the auxiliary conveyor 4 or 4' by the cross conveyor 2 engaged thereby, and more particularly without stopping the main conveyor 1. The cross conveyor 2 moves with a high velocity so that piece goods 3 can be conveyed on the main conveyor 1 in tight sequence or dense succession. As soon as the piece good 3" has reached the distributor conveyor 5, respectively, 5' and is located on the same, the distributor conveyor 5, respectively, 5' starts to move in a given direction, and the piece good 3" slides on an intermediate track 61, 62, 63 or 64 downwardly onto a platform 8 of a sorting station 71, 72, 73 or 74. The identity of the piece good 3'" is determined thereat by a person 19 and the type number and the like is fed into the input of a central storage or memory device. Similar types of goods or groups of goods are collected in a container 3' coordinated to the types of goods, respectively, groups of goods. After filling the container 3', the latter is pushed onto the feed conveyor 9, respectively, 9' on which the container moves to abutment at the loading roller 11, respectively, 11'. As soon as a sufficiently large gap between successive piece goods exists on the delivery conveyor 10, the drive of the loading roller 11, respectively, 11' is turned on, the piece good 3' is pushed onto the delivery conveyor 10 and is transported on the same to the coordinated storage place.

Of course, it will be determined in each case by correspondingly arranged and constructed sensors or corresponding control devices, in which direction the piece good can be conveyed on the cross conveyor 2 or the distributor conveyor 5, respectively, 5'. Consequently, it will be determined, prior to starting the cross conveyor 2, which distributor conveyor 5 or 5' is free. If both are filled, the cross conveyor 2 remains at rest, and the piece good 3 is further conveyed on the main conveyor 1. It will be correspondingly determined prior to turning on the distributor conveyor 5, respectively, 5' whether the lower end of the intermediate track 61, 62, 63 or 64 is free. Possibly, there will be such a delay until the platform 8 is free at this location.

The piece good can be conveyed individually independently of its size or also in containers.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A sorting installation for piece goods, comprising a main conveyor means, a cross conveyor means arranged in the main conveyor means, auxiliary conveyor means connected to the cross conveyor means, reversibly drivable distributor conveyor means disposed at and extending substantially perpendicular to the outlet of the auxiliary conveyor means, opposite ends of said distributor conveyor means being connected with respective sorting stations by intermediate track means, delivery conveyor means coordinated in common to said sorting stations, and feed conveyor means disposed between the sorting stations and said delivery conveyor means, said delivery conveyor means being disposed substantially directly underneath the main conveyor means and said feed conveyor means being disposed substantially directly underneath said auxiliary conveyor means.

2. A sorting installation according to claim 1, wherein the main conveyor means, the auxiliary conveyor means and the distributor conveyor means together with the intermediate track means are arranged approximately U-shaped.

3. A sorting installation according to claim 2, wherein the cross conveyor means is constructed so as to be operable to be driven reversibly, one auxiliary conveyor means with distributor conveyor means, intermediate track means, sorting stations and feed conveyor means being arranged at each of the ends of the cross conveyor means.

4. A sorting installation according to claim 3, wherein the cross conveyor means is constructed in the main conveyor means as chain pusher means including endless chains extending below the conveying plane of the main conveyor means and guided transversely thereto, a movable pusher being arranged on the chains above the conveyance plane.

5. A sorting installation according to claim 4, wherein the main conveyor means is constructed as a belt conveyor whose belt within the area of the chains is deflected by deflection rollers into loops open toward the top, only the upper section of the chains being guided in said loops.

6. A sorting installation according to claim 5, wherein several pushers arranged at identical spacings are secured on the chains, of which one pusher each is disposed in the normal position laterally adjacent the main conveyor means.

7. A sorting installation according to claim 6, wherein three pushers are provided, of which the pusher disposed respectively on the lower section of the chains serves as contact for a switch means to turn off the drive of the cross conveyor means.

8. A sorting installation according to claim 7, wherein the feed conveyor means is constructed as gravity-roller track whose last roller ahead of the delivery conveyor means is constructed as loading roller means operable to be driven.

9. A sorting installation according to claim 8, wherein the loading roller means is supported slightly raised with respect to the conveyance plane of the feed conveyor means.

10. A sorting installation according to claim 1, wherein the cross conveyor means is constructed so as to be operable to be driven reversibly, one auxiliary conveyor means with distributor conveyor means, intermediate track means, sorting stations and feed conveyor means being arranged at each of the ends of the cross conveyor means.

11. A sorting installation according to claim 1, wherein the cross conveyor means is constructed in the main conveyor means as chain pusher means including endless chains extending below the conveying plane of the main conveyor means and guided transversely thereto, a movable pusher being arranged on the chains above the conveyance plane.

12. A sorting installation according to claim 11, wherein the main conveyor means is constructed as a belt conveyor whose belt within the area of the chains is deflected by deflection rollers into loops open toward the top, only the upper section of the chains being guided in said loops.

13. A sorting installation according to claim 11, wherein several pushers arranged at identical spacings are secured on the chains, of which one pusher each is disposed in the normal position laterally adjacent the main conveyor means and each pusher has a length sufficient to be connected to all the chains.

14. A sorting installation according to claim 13, wherein three pushers are provided, of which the pusher disposed respectively on the lower section of the chains serves as contact for a switch means to turn off the drive of the cross conveyor means.

15. A sorting installation according to claim 1, wherein the feed conveyor means is constructed as gravity-roller track whose last roller ahead of the delivery conveyor means is constructed as loading roller means operable to be driven.

16. A sorting installation according to claim 15, wherein the loading roller means is supported slightly raised with respect to the conveyance plane of the feed conveyor means.

* * * * *